United States Patent [19]
Keller

[11] Patent Number: 4,719,746
[45] Date of Patent: Jan. 19, 1988

[54] GAS TURBINE WITH A PRESSURE WAVE MACHINE AS THE HIGH PRESSURE COMPRESSOR PART

[75] Inventor: Jakob Keller, Dottikon, Switzerland

[73] Assignee: BBC Brown, Boveri & Company, Limited, Baden, Switzerland

[21] Appl. No.: 887,204

[22] Filed: Jul. 21, 1986

[30] Foreign Application Priority Data

Jul. 31, 1985 [CH] Switzerland ............... 3319/85

[51] Int. Cl.[4] ............... F02C 3/02; F02G 1/00
[52] U.S. Cl. ............... 60/39.17; 60/39.45
[58] Field of Search ............ 60/39.45 A, 39.45 R, 60/39.161, 39.17; 417/64

[56] References Cited

U.S. PATENT DOCUMENTS

| | | | |
|---|---|---|---|
| 2,461,186 | 2/1949 | Seippel | 60/39.45 A |
| 2,940,656 | 6/1960 | Spalding | 60/39.45 A |
| 3,003,315 | 10/1961 | Dudley | 60/39.45 |
| 3,043,106 | 7/1962 | Coleman, Jr. | 60/39.45 A |

FOREIGN PATENT DOCUMENTS

| | | |
|---|---|---|
| 280083 | 8/1912 | Fed. Rep. of Germany . |
| 229280 | 11/1947 | Sweden . |
| 95548 | 7/1922 | Switzerland . |
| 342415 | 12/1959 | Switzerland . |
| 420734 | 3/1967 | Switzerland . |
| 820151 | 9/1959 | United Kingdom . |

Primary Examiner—Carlton R. Croyle
Assistant Examiner—Donald E. Stout
Attorney, Agent, or Firm—Burns, Doane, Swecker & Mathis

[57] ABSTRACT

The high pressure compressor part of a gas turbine installation having a high pressure, a medium pressure and a low pressure part (21 and 22, 23) of the gas turbine is provided by a pressure wave machine in which the high pressure gas is generated by self-ignition of liquid or gaseous fuel, which is injected or blown into the cell rotor in the region of the low pressure air port from the fuel nozzles in a casing of the pressure wave machine. The self-ignition occurs as a detonation when the fuel impinges on a compression wave occuring in the region of the fuel injection. The pressure waves occuring generate, on the one hand, high pressure air in the zones (B) and (C), which are fed through a high pressure air port to a combustion chamber for the generation of driving gas for the gas turbine. On the other hand, the pressure waves generate a medium pressure driving gas and a low pressure driving gas in a zone (D) during the advance of the cells of the rotor in the rotor space, which gases are fed via ports into the casings or the medium pressure and the low pressure part of the turbine.

3 Claims, 5 Drawing Figures

GAS TURBINE WITH A PRESSURE WAVE MACHINE AS THE HIGH PRESSURE COMPRESSOR PART

BACKGROUND OF THE INVENTION

The present invention concrens a gas turbine with a pressure wave machine as the high pressure compressor part.

It has been demonstrated, for example in Swiss Pat. No. 229,280, that pressure wave machines, particularly when designed as pressure exchangers, are advantageous as the high pressure compressor part of stationary gas turbine installations. In a pressure wave machine, both hot gas and relatively cold air flow through the machine so that, as far as the heat loading on the part subjected to gas is concerned, an equilibrium temperature arises which is substantially lower than the maximum exhaust gas temperature. At least part of the fuel can therefore be burnt at a substantially higher temperature than is possible in a conventional gas turbine installation. This is the immediate reason why the use of pressure wave machines as high pressure compressors or instead of high pressure turbines can improve the efficiency of gas turbine installations. The main disadvantages of the previously known pressure wave machines and which limit their practical application, consist of the following:

The walls in the region of the high temperature chamber become very hot;

the time between the formation of the hottest exhaust gases and their cooling by the expansion waves or by mixing with cooler gases is so long that the formation of oxides of nitrogen cannot be excluded;

in the case of ideal design of the pressure wave machine as a pressure exchanger, in which there is no interaction between the pressure waves and the media separation fronts, the flow mach numbers are so high that large flow losses can occur;

and, finally, the media boundaries between the exhaust gas and the air are often very long so that mixture zones arise which can be very wide, mainly due to the centrifugal forces in the rotor and the formation of eddies in the region of the exhaust gas inlet openings.

OBJECTS AND SUMMARY

The present invention has the objective of correcting these shortcomings of known pressure wave machines which have been proposed for use as the high pressure compressor part of gas turbine installations.

DESCRIPTION OF THE DRAWINGS

The invention is described in more detail below using an embodiment example shown in the drawing. In the drawing:

FIG. 4 is a schematic view of an alternative embodiment of the present invention and, FIG. 5 is a view of the alternative embodiment of the present invention in association with a two-step gas turbine.

DETAILED DESCRIPTION

Figure 1:
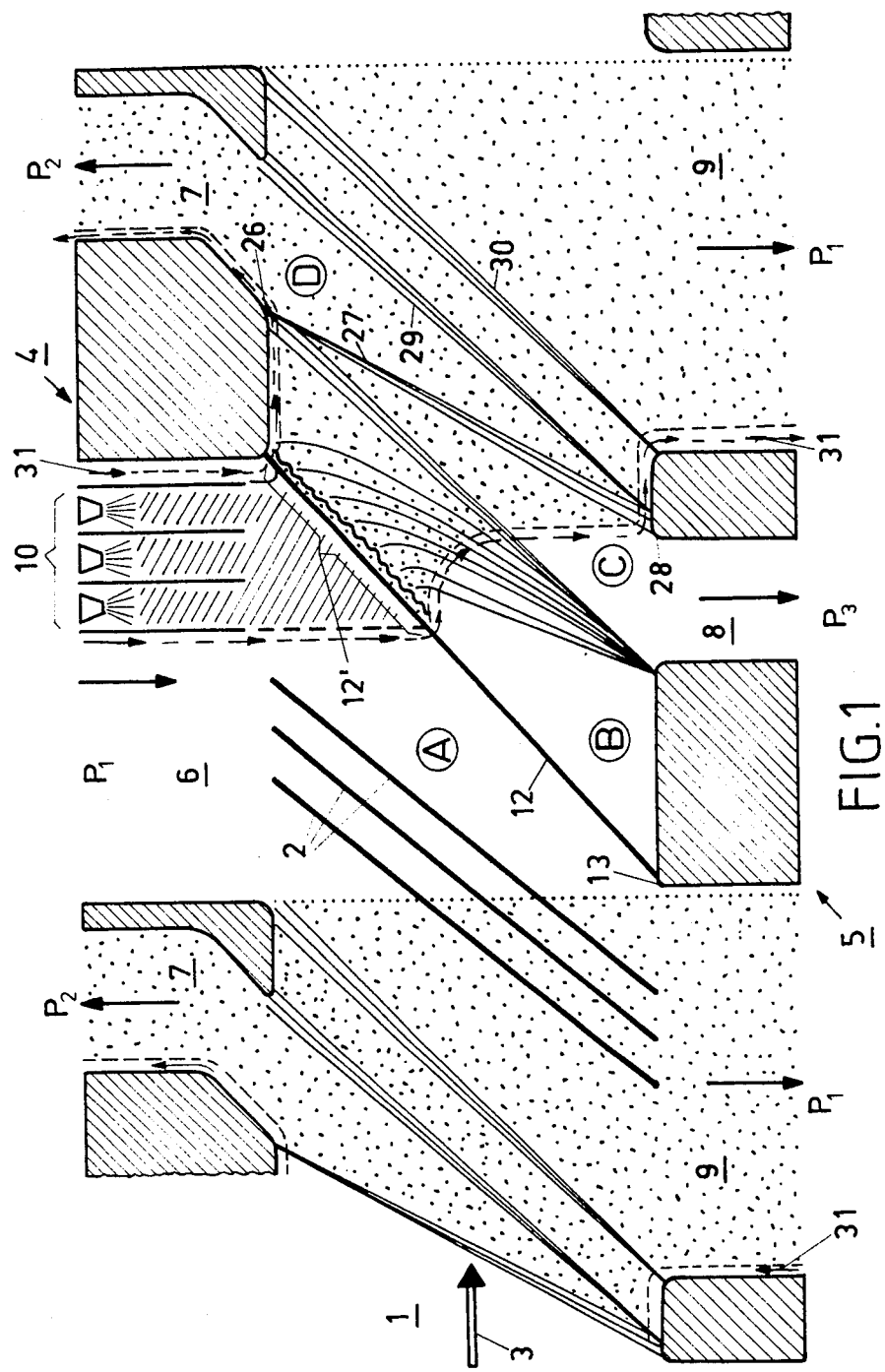
FIG. 1 is a schematic view of the cycle of the pressure wave process of the pressure wave machine according to the invention.

FIG. 1 show, diagrammatically in a developed view, the parts of the detonation pressure wave machine to the extent that they are needed for explaining the pressure wave process. Only three cell walls 2 of a rotor 1 are shown; these cell walls can with advantage run obliquely to the peripheral direction but they could, in principle, also be arranged at right angles to the peripheral direction. The rotor 1 runs with very little clearance in a casing, not shown, which is closed at the two rotor ends by two casings 4 and 5 with air and gas ports. The left-hand casing 4, seen in the direction of the rotational direction arrow 3, contains per cycle (and this shall be understood to mean the totality of the ports necessary for a pressure wave process ) a low pressusre air port 6 for the supply of air from a compressor of the gas turbine installation shown in FIG. 2 and whose interaction with the pressure wave machine is discussed comprehensively below, and a medium pressure gas port 7. The right-hand casing 5 has a high pressure air port 8 and a low pressure gas port 9, whose function and interaction with the gas turbine installation are also described in association with FIG. 2.

Figure 2:
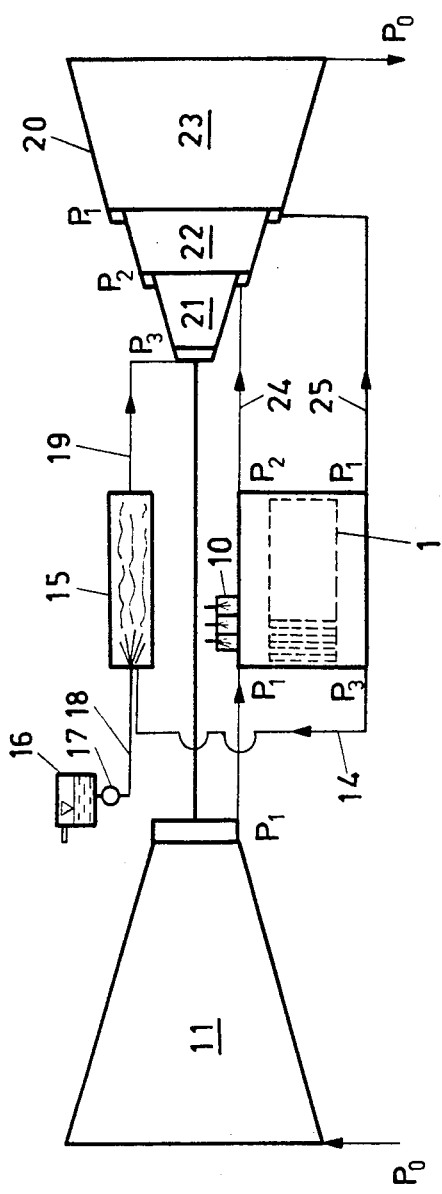
FIG. 2 is a view of the pressure wave machine according to the invention is association with a gas turbine installation.

In the casing 4, the relatively wide (in the rotor peripheral direction) low pressure air port 6 receives air of pressure $P_1$ from the compressor 11 of the gas turbine installation shown in FIG. 2. When low pressure air is referred to here, this should not be understood in an absolute sense but as low only in comparison with the other pressure levels of the installation. The pressure wave process to be described here could, for example, be effected with a final pressure $p_1 = 16$ bar of the air compressed in the compressor 11 and a temperature of 400° C. This air therefore passes through the front part of the low pressure air port into the cell rotor 1. In the rear part of the port 6, seen in the rotor direction of rotation, there is a row 10 of fuel nozzles, three of them in the example shown. Finely atomised fuel oil is mixed into the air by these fuel nozzles. Air can be branched off from the high pressure air port 8 for atomisation purposes. This only represents a very small proportion of the total high pressure air flow and this proportion is not significant to the overall process. If a stoichiometric air/diesel oil mixture is injected into the air in the zone A, which air has a pressure of $p_1 = 16$ bar and a temperature of 400° C., this mixture ignites spontaneously after about 3 milliseconds. This corresponds to the self-ignition process in a diesel engine. A primary compression wave 12 occurs in the zone A. This compression wave starts at the closing edge 13 of the port 9 in the combustion chamber side casing 5 and retards the air and the air/diesel oil mixture. The fuel nozzles are so arranged with reference to the primary compression wave 12 that the elapsed time between the beginning of injection by the individual nozzles and the impingement of the atomised fuel jets onto the primary compression wave 12 is somewhat smaller than the elapsed time of 3 milliseconds mentioned as being necessary for self-ignition. The mixture is therefore immediately ignited by the primary compression and this initiates a detonation wave in the zone 12'. The air in the zone B, which has already been precompressed by the retardation due to the primary compression, is compressed by the detonation process to a pressure $p_3$ and is forced through the high pressure air port 8 and a high pressure air duct 14 into a controllable combustion chamber 15, which obtains its fuel from a fuel tank 16 through a fuel pump 17 and a fuel duct 18, see FIG. 2. The driving gases generated in the combustion chamber 15 pass through a driving gas duct 19 into the high pressure part 21 of a gas turbine 20, which also has a medium pressure part 22 and a low pressure part 23.

Figure 3:
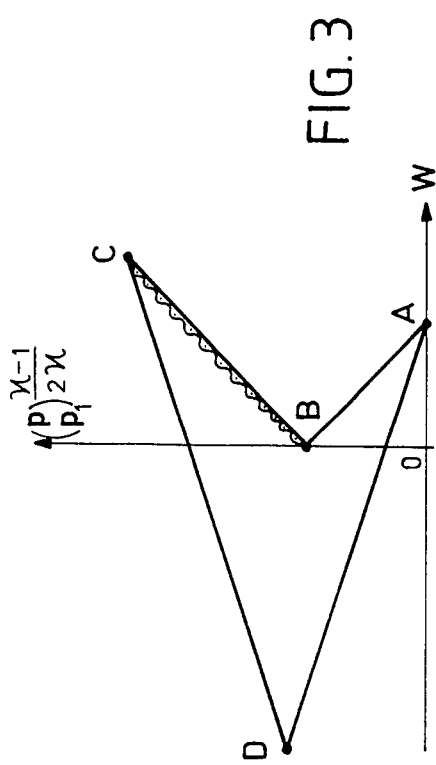
FIG. 3 is a view of the pressure wave process in a velocity/ pressure diagram.

The driving gases produced by the combustion in the zone D emerge through the port 7 and 9 and pass through a medium pressure gas duct 24 or a low pressure gas duct 25 into the medium pressure part 22 or the low pressure part 23 of the turbine 20. This corresponds to partial reheat of the partially expanded driving gases at the end of the high pressure part 21 and the medium pressure part 22. They are there respectively expanded to the inlet pressure of the following turbine part or, in the low pressure part, to the back pressure $p_o$ = atmospheric pressure. The fact that the part of the driving gases in zone D emerging through the port 7 is expanded to the pressure $p_2$ before the medium pressure part 22 of the turbine prevents the part of the driving gases emerging through the port 9, which is expanded to $p_1$, from attaining excessively high velocities. The double change in direction of the velocity, which can be seen from the velocity/pressure diagram of the pressure wave process in FIG. 3, ensures that the expansion waves occurring in the driving gas do not generate excessively high flow velocities but do, nevertheless, generate a sufficiently high pressure drop. An expansion wave 27 runs from the opening edge 26 of the medium pressure gas port 7 in the casing 4 to the closing edge 28 of the high pressure air port 8 in the casing 5 and expands the driving gas from the pressure $p_3$ and $p_2$. Part of the driving gas in zone 8 passes through an expansion wave pair 29, 30 and is thus expanded to the pressure $p_1$. Flow arrows 31 in the region of the ports 6, 7, 8 and 9 indicate cooling air flows which cool the casing parts subjected to the hot driving gases. Overheating of these parts is also avoided by locating the fuel nozzles sufficiently far from the casing parts so that the latter are not subject to the fuel jets, for example the part in the region of the closing edge of the low pressure air port 6.

It is advantageous to design the controllable combustion chamber in such a way that the driving gases generated in it at maximum load precisely reach the permissible limiting temperature of the blading at entry to the high pressure part 21 of the turbine. As already mentioned above, the hot driving gas of pressure $p_2$ from the port 7 is mixed with the partially expanded and correspondingly cooled driving gases after the high pressure part 21; this is done in such a way that the heated driving gas mixture again exactly reaches the limiting temperature of the first stage of the medium pressure part 22. After expansion from $p_2$ to $p_1$ in the medium pressure part, the second part of the driving gas at a pressure of $p_1$ from the port 9 is mixed with the driving gas, the mixture being again heated to the limiting temperature. In this way, a rough approximation to the isothermal expansion of the Carnot cycle is obtained for the turbine.

The scavenging air quantity supplied to the zone B depends on the position and number of the fuel nozzles. By appropriately arranging the nozzles, it is also possible to achieve the result that only air is blown out from the zone B into the port 7. This means that the relevant part of the casing is only subjected to air. Such a gas turbine is shown in FIGS. 4 and 5. By using a rotor 1 with diagonal cells 2, a no-loss combination of the two partial air flows at different pressures can be achieved by energy division in the cells; this is possible because air emerging at D in the direction of rotation of the rotor obtains a surplus of dynamic pressure at the expense of the air emerging in the opposite direction at C. The pressure wave machine should then be so designed that the strength of the expansion wave corresponds approximately to the dynamic pressure difference mentioned. In this case, according to FIG. 5, the medium pressure turbine is omitted. A great advantage of this special case consists in the fact that all the casing parts, including the wall part between the closing edge of the port 7 and the opening edge of the port 6, is flushed by cooling air films. Even if this extreme case is not disregarded, it is possible—by changing the scavenging air quantity and thus affecting the temperature of the driving gas quantity for the medium pressure turbine—to provide good matching between the pressure wave machine and the operating properties of the turbine.

The main advantages of this detonation pressure wave machine relative to conventional pressure wave machines are as follows: It is possible to avoid the hottest gases, which occur in the detonation region, coming into contact with the casing parts; the separation front between the driving gas and the air only occurs in the rotor and is very short; only the air column in the zone C reaches high Mach numbers and this only occurs directly before the entry into the high pressure air port 8; since the time between the detonation of the air/fuel oil mixture and the cooling of the driving gases by expansion waves is very short, in fact about 1 millisecond, it is hardly possible for oxides of nitrogen to occur; because of the small number of casing parts, the power density is very high and the leakage loss low; finally, it may be expected that the efficiency of the pressure wave machine and the gas turbine installation overall will be very high because the combustion takes place at a very high pressure and a high temperature. The totality of the ports 7, 8 and 9 will be connected in practice by one receiver each which will, in turn, be connected respectively via the high pressure air duct 14, the medium pressure gas duct 24 and the low pressure gas duct 25 to the burner 15, the medium pressure part 22 and the low pressure part 23, respectively, of the turbine 20. Gaseous fuels can also be considered as well as liquid fuels, in which case the arrangement of the nozzles 10 in the low pressure air port 6 should, as described above, correspond to the self-ignition behaviour of the gas concerned.

For artificial ignition, driving gas recirculation might also be considered, in which case a small driving gas flow must be supplied directly in front of the fuel ports, viewed in the rotational direction.

While this invention has been illustrated and described in accordance with preferred embodiments, it is recognized that variations and changes may be made therein without departing from the invention as set forth in the claims.

I claim:

1. In a gas turbine installation with a pressure wave machine as a high pressure compressor, which pressure wave machine is connected downstream of a low pressure compressor,
the gas turbine installation having a gas turbine, which is coupled to the low pressure compressor, and which has a high pressure part, a medium pressure part and a low pressure part, the installation also having a controllable combustion chamber, whose burner is supplied with high pressure air delivered by the pressure wave machine and with a fuel, and wherein driving gases produced in the combustion chamber are supplied through a driving gas duct to the high pressure part of the turbine and pass through the three parts mentioned, the pressure wave machine including a cell rotor with rotor cells, a rotor casing surrounding the periphery of the cell rotor, a first casing having a low pressure air port connected to the low pressure compressor, and a second casing with a high pressure air port connected to the combustion chamber via a high pressure air duct, which casings close the ends of the rotor casing mentioned, said cell rotor with rotor cells including means for generating a compression wave in the rotor cells during operation of the pressure wave machine, the compression wave starting from a closing edge of a low pressure gas port in the rotor casing;

the improvement comprising;

fuel nozzle means in a rear region of the low pressure air port of the first casing as seen in the rotor rotational direction for discharging fuel onto the compression wave prior to ignition of the fuel so as to cause self-ignition of the fuel upon impact with the compression wave, the compression wave being in the rotor cells then located in the region of the fuel nozzle means;

one medium pressure gas port in the first casing after the low pressure air port as seen in the direction of rotation of the rotor, which medium pressure gas port is connected, via a medium pressure duct to an inlet space of the medium pressure part of the gas turbine; and one low pressure gas port after the high pressure air port as seen in the direction of rotation of the rotor in the casing containing the high pressure air port, which low pressure gas port is connected via a low pressure gas duct to an inlet space of the low pressure part of the gas turbine.

2. In a gas turbine installation with a pressure wave machine as a high pressure compressor, which pressure wave machine is connected downstream of a low pressure compressor, the gas turbine installation having a gas turbine, which is coupled to the low pressure compressor, and which has a high pressure part and a low pressure part, the installation also having a controllable combustion chamber whose burner is supplied with high pressure air delivered by the pressure wave machine and with a fuel, and wherein driving gases produced in the combustion chamber are supplied through a driving gas duct to the high pressure part of the turbine and pass through the two parts mentioned, the pressure wave machine including a cell rotor with rotor cells, a rotor casing surrounding the periphery of the cell rotor, a first casing having a low pressure air port connected to the low pressure compressor, and a second casing with a high pressure air port connected to the combustion chamber via a high pressure air duct, which casing close the ends of the rotor casing mentioned, said cell rotor with rotor cells including means for generating a compression wave in the rotor cells during operation of the pressure wave machine, the compression wave starting from a closing edge of a low pressure gas port in the rotor casing;

the improvement comprising:

a fuel nozzle means arranged in a rear half of the low pressure air port at a distance from the closing edge of the low pressure air port of the first casing for discharging fuel from the fuel nozzle means onto the compression wave prior to ignition of the fuel so as to cause self-ignition of the fuel upon impact with the compression wave, the compression wave being in the rotor cells then located in the region of the fuel nozzle means;

one medium pressure gas port being present in the first casing after the low pressure air port, as seen in the direction of rotation of the rotor, which medium pressure gas port being connected, via a medium pressure duct, to the combustion chamber; and one low pressure gas port being present after the high pressure air port, as seen in the direction of rotation of the rotor, in the casing containing the high pressure air port, which low pressure gas port is connected via a low pressure gas duct to an inlet space of the low pressure part of the gas turbine.

3. The invention of claim 2, wherein the distance between the fuel nozzle means and the walls of the low pressure air port being large enough so that all parts of the walls are flushed by low pressure air.

* * * * *